United States Patent
Robinson et al.

(10) Patent No.: US 8,479,193 B2
(45) Date of Patent: Jul. 2, 2013

(54) METHOD, APPARATUS AND SYSTEM FOR ENHANCING THE USABILITY OF VIRTUAL MACHINES

(75) Inventors: Scott H. Robinson, Portland, OR (US); Vijay Tewari, Portland, OR (US); Robert C. Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2356 days.

(21) Appl. No.: 11/016,654

(22) Filed: Dec. 17, 2004

(65) Prior Publication Data

US 2006/0136911 A1    Jun. 22, 2006

(51) Int. Cl.
*G06F 9/455*    (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 6,901,445 B2 | 5/2005 | McCanne et al. | |
| 7,260,820 B1 * | 8/2007 | Waldspurger et al. | 718/1 |
| 7,406,691 B2 * | 7/2008 | Fellenstein et al. | 718/104 |
| 7,535,477 B2 * | 5/2009 | Zaima et al. | 345/619 |
| 2002/0173863 A1 * | 11/2002 | Imada et al. | 700/83 |

* cited by examiner

*Primary Examiner* — Mengyao Zhe

(74) *Attorney, Agent, or Firm* — Barnes & Thornburg, LLP

(57) ABSTRACT

A method, apparatus and system for improving usability of virtual machines is described. A console module on a VM host may continuously monitor incoming data (e.g., files and/or attachments) and make automatic determinations regarding how and/or whether to intercept, route, redirect and/or deliver the data (e.g., where to store files, when and/or whether to deliver the files, execute the files, etc.). Additionally, in one embodiment, a unification console may be provided to enhance the usability of the VM host. The unification console enables the user to view the VM host via a unified desktop interface while handling the underlying switching and/or interactions between VMs.

14 Claims, 4 Drawing Sheets

HOST 100

METHOD, APPARATUS AND SYSTEM FOR ENHANCING THE USABILITY OF VIRTUAL MACHINES

BACKGROUND

Virtualization technology enables a single host computer running a virtual machine monitor ("VMM") to present multiple abstractions and/or views of the host, such that the underlying hardware of the host appears as one or more independently operating virtual machines ("VMs"). Each VM may function as a self-contained platform, running its own operating system ("OS") and/or a software application(s). The VMM manages allocation of resources on the host and performs context switching as necessary to cycle between various virtual machines according to a round-robin or other predetermined scheme.

Given the complexity and processing requirements of virtualization, this technology has typically been available only on workstations, servers and/or mainframes for use by sophisticated users. As processor technology advances, however, virtualization is being made available in the desktop environment for use by average users.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
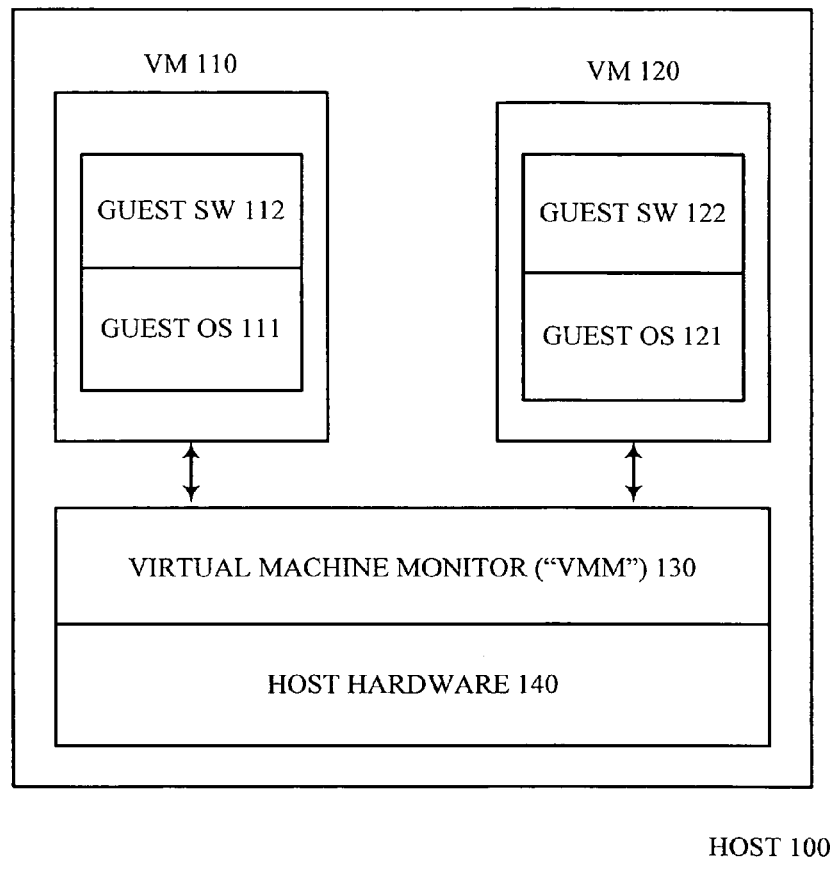
FIG. 1 illustrates an example of a typical VM host.

Various embodiments of the present invention simplify the usability of virtual machines and provide users with an enhanced scheme for managing virtual machines. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

According to one embodiment of the present invention, a console module on a VM host may continuously monitor and/or filter incoming and/or outgoing data (e.g., file requests, network ports/streams (e.g. Hyper Text Transport Protocol ("HTTP")), files, streams and/or attachments) and make automatic determinations regarding how to manage the data (e.g., where to store files, when and/or whether to deliver the files, execute the files, etc.). In one embodiment, the console module may perform such monitoring and/or filtering at "choke points" in and out of the VMs running on the VM host, i.e., points on the VM through which all input/output (I/O) to and from the VM typically traverse.

As previously described, virtualization is becoming more commonly available in the desktop environment. In this environment, the most likely users are unlikely to be computer professionals (e.g., information technology specialists in corporate environments) but rather less sophisticated users (e.g., home personal computer ("PC") users and/or non-technical, less sophisticated corporate users). The applications that run within the desktop environment and the types of uses for the applications may also differ from corporate applications. For example, one use of virtualization in a home (and the associated advantage of running one or more independent VMs on a host) may be for each family member to be allocated one or more VM partition(s) with their own customized environment(s), e.g., a gaming VM partition, a Personal Video Recorder ("PVR") appliance VM, an enterprise Information Technology ("IT") supplied VM for telecommuting, etc. In this environment, the average home PC user may be overwhelmed by the task of understanding and/or managing the VM partitions (e.g., moving files, setting up access permissions, etc.).

In addition to the overwhelming task of managing the VM partitions, users also have to handle the proliferation of viruses and other such computer "attacks", which are becoming increasingly more common. A typical mode of attack for a computer virus, for example, is to send an electronic mail message (email) containing a file attachment to an unsuspecting user's computer. The file attachment may contain malicious attack data, and the email may contain some inducement for the user to launch the file attachment. When the user clicks on the file attachment, the attack data embedded in the file may be executed. The attack data may then access an address book and send the file attachment in an email to addresses found in the address book. The attack data may then try to modify files on the user's computer or obtain other files and mail them back to the attackers. It is well known in the art that various other modes of attack may also be employed other than email.

Embodiments of the present invention provide users with an improved management scheme that enhances the usability of virtual machines. More specifically, embodiments of the present invention improve usability and security in a virtualized environment. It improves usability, for example, by simplifying management of the VM partitions and automating the classification, replication, filtering and/or transforming of data and/or data requests entering and leaving these partitions. FIG. 1 illustrates an example of a typical virtual machine host platform ("Host 100") within which embodiments of the invention may be implemented. As previously described, a virtual-machine monitor ("VMM 130") typically runs on the host platform and presents an abstraction(s) and/or view(s) of the platform (also referred to as "virtual machines" or "VMs") to other software. Although only two VM partitions are illustrated ("VM 110" and "VM 120", hereafter referred to collectively as "VMs"), these VMs are merely illustrative. Host 100 may be running only one VM and/or additional virtual machines may be added to the host. VMM 130 may be implemented in software (e.g., as a standalone program and/or a component of a host operating system), hardware, firmware and/or any combination thereof.

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software operates as if it were running on a dedicated computer. That is, each Guest OS and/or Guest Software may expect to control various events and have access to hardware resources on Host 100. Within each VM, the Guest OS and/or Guest Software may behave as if they were, in effect, running on Host 100's physical hardware ("Host Hardware 140"). In reality however, VMM 130 has ultimate control over the events and hardware resources and allocates resources to the Virtual Machines according to its own policies. Recursive or layered VM schemes may also be possible, e.g., VM 110 may host another virtual host (which appears to have behaviors like physical host 100). These types of recursive schemes are well known to those of ordinary skill in the art and further description thereof is omitted herein in order not to unnecessarily obscure embodiments of the present invention.

Embodiments of the present invention provide for improved VM management, e.g., by simplifying file management within the VMs and ensuring that VMs on the host are isolated from potentially harmful and/or malicious data. Thus, in one embodiment, a module on Host 100 may automatically perform all of the content management on the host, e.g., handle all incoming data received by the host and making decisions such as where to deliver and/or store the data, deciding when and/or where to execute the data and/or whether to provide one or more of the VMs on the host with access to the data. By automatically making these determinations based on predetermined criteria, this scheme effectively enhances the user experience (because the user does not have to understand the underlying structure/organization of the VMs on the host) as well as provides a mechanism to decrease the likelihood of malicious data infecting multiple VMs (e.g., by enforcing a security policy such as isolating suspicious data into a predetermined VM).

Figure 2:
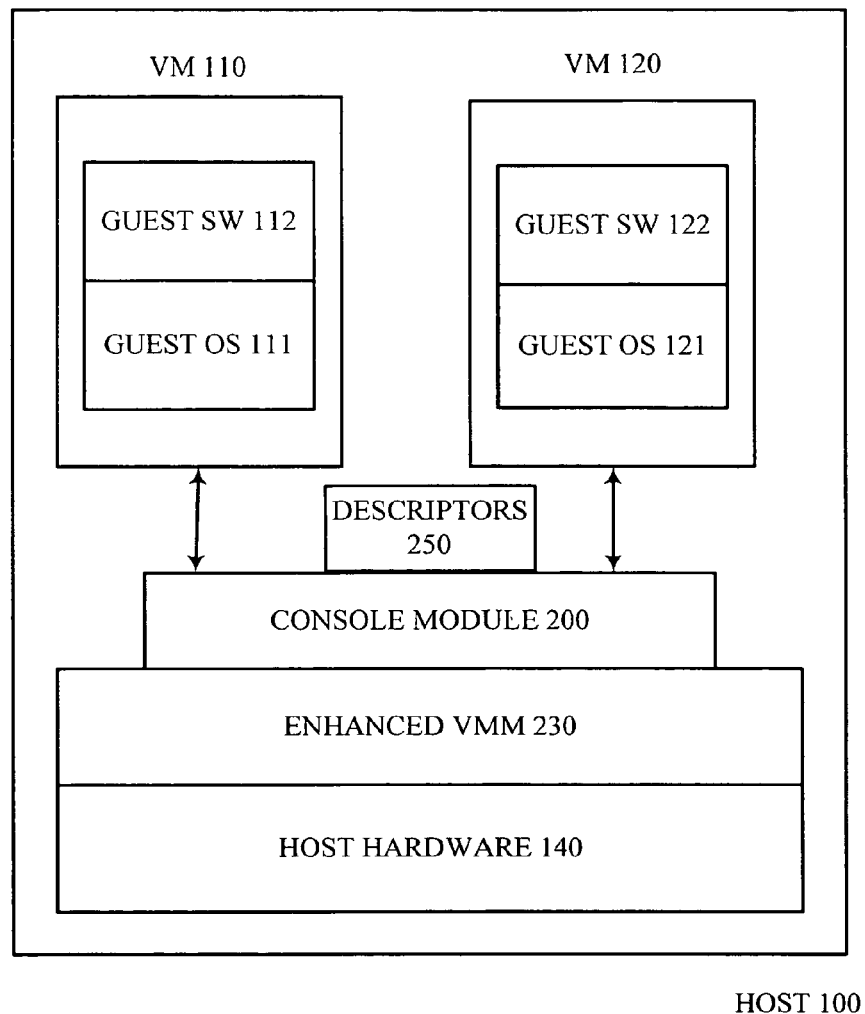
FIG. 2 illustrates a host computing device according to an embodiment of the present invention.

FIG. 2 illustrates a host computing device according to an embodiment of the present invention. As illustrated, a module on Host 100 ("Console Module 200") may monitor and/or intercept all communications on Host 100. Console Module 200 may then examine the communication to determine whether any data is associated with the communication. Console Module 200 may be configured according to various predetermined criteria. Thus, for example, if the communication is an email with an attachment, Console Module 200 may intercept the email and identify the attachment. In one embodiment, Console Module 200 may identify the communication as an email and determine how to handle email attachments from its predetermined criteria. The predetermined criteria may, for example, require Console Module 200 to forward the email to the appropriate VM after running a virus check. In an alternate embodiment, the predetermined criteria may require Console Module 200 to store all email attachments to a specific VM, to limit the exposure of the remaining VMs on Host 100 to potentially malicious data. In yet another embodiment, Console Module 200 may comprise a VM and the predetermined criteria may require Console Module 200 to extract, store and/or execute the email attachment within Console Module 200. In another embodiment, Host 100 may run its user mail agent in a dedicated VM and the email may be forwarded in its entirety to only that VM. Again, this scheme provides a degree of isolation between the VMs on the host and potentially malicious data. Although the example above focuses on email data, embodiments of the invention are not so limited and may extend to any data accessed by and/or received by Host 100.

In one embodiment, in layered virtualization systems, Console Module 200 may have oversight of all VMs and/or some select layer or layers of VMs. In various embodiments of layered systems, Console Module 200 may, itself, be virtualized and different instances of Console Module 200 may be running in different layers (with the respective VMMs). As previously explained above, recursive schemes are well known to those of ordinary skill in the art and further description thereof is omitted herein.

As described above, the predetermined criteria provide Console Module 200 with the requisite information necessary to manage the files on the host, to simplify the user's experience as well as to provide enhanced security. In one embodiment, these predetermined criteria may be stored as "descriptors" (shown collectively in FIG. 2 as "Descriptors 250") on Host 100. A descriptor, for the purposes of this specification, shall include a registry or other such listing (e.g. database) which describes various parameters (e.g., associated metadata containing configuration and/or resource information and permission/Access Control List ("ACL") information) for the user about the computing environment, such as the user's identity and permissions, applications, virtual machines, and Console Module 200's configuration.

Thus, for example, when a user logs in to Host 100, a default descriptor may be automatically loaded. The default descriptor may, for example, describe the default VMs for the user as well as other management policies and rules (e.g. filters and transformations) for Console Module 200. In an alternative embodiment, the user may be prompted to select-a-descriptor from Descriptors 250 or build a new descriptor for use during the user's current session. In one embodiment, Descriptors 250 may be an enhanced startup group, with additional metadata to provide information to Console Module 200. The concept of startup groups is well known to those of ordinary skill in the art and further description thereof is omitted herein. In one embodiment of the present invention, Descriptors 250 may be provided by an IT organization to all corporate users. Alternatively (or in addition), the user may edit Descriptors 250 at any time, to customize the descriptors for various sessions. Descriptors 250 may be used by Console Module 200 at startup of Host 100, when the user logs into Host 100 and/or during the user's interaction with various applications on Host 100.

Descriptors 250 thus provide Console Module 200 with the information necessary to perform automatic content management on Host 100. Descriptors 250 may, for example, contain information about automation scripts to apply to certain incoming and/or outgoing data. Descriptors 250 may also include information about certain data types, VMs, and/or data sources that should not be filtered, modified, and/or monitored by the Console Module 200. A set of rules, patterns and/or policies may be defined on Host 100 to dictate how Console Module 200 may utilize Descriptors 250 (e.g., the order and priority of descriptor evaluation and/or how to resolve conflicts). In one embodiment, various ones of Descriptors 250 may be controlled by users, while others of Descriptors 250 may be controlled by the system (e.g. a "root" or "super user" account). As previously described, Descriptors 250 may be governed through ACLs (permissions) and/or other metadata similar to that for file systems.

Descriptors 250 may be manipulated in various ways, e.g., copied, deleted, enabled, disabled, edited, etc. The effect and scope of a given Descriptor 250 may vary as required. For example, Descriptors 250 may be applicable to individual users, to one or more groups or users or to the entire system, i.e., all VMs and/or users on Host 100. Additionally, Descriptors 250 may comprise a collection of descriptors (i.e., a collection of registries or other such listings), and upon applying the information from a first descriptor, Console Module 200 determine that the information from a second descriptor should also be applied. In other words, in one embodiment, upon applying a first descriptor, the conditions on Host 100 may change such that a second descriptor may also be applicable. This process may continue until multiple descriptors are applied, as appropriate. Additionally, in various embodiments, when Console Module 200 acts based on information in Descriptors 250, it may retain/log various details from the action. For example, when saving a file, Console Module 200 may update a log file, a database, and/or related file metadata with information about the action (e.g. file source, descriptor rules, etc). This type of information may be useful to Console Module 200 for tuning performance and/or to the user (e.g., if a user is searching for a video file from a specific user, etc.)

Figure 3:
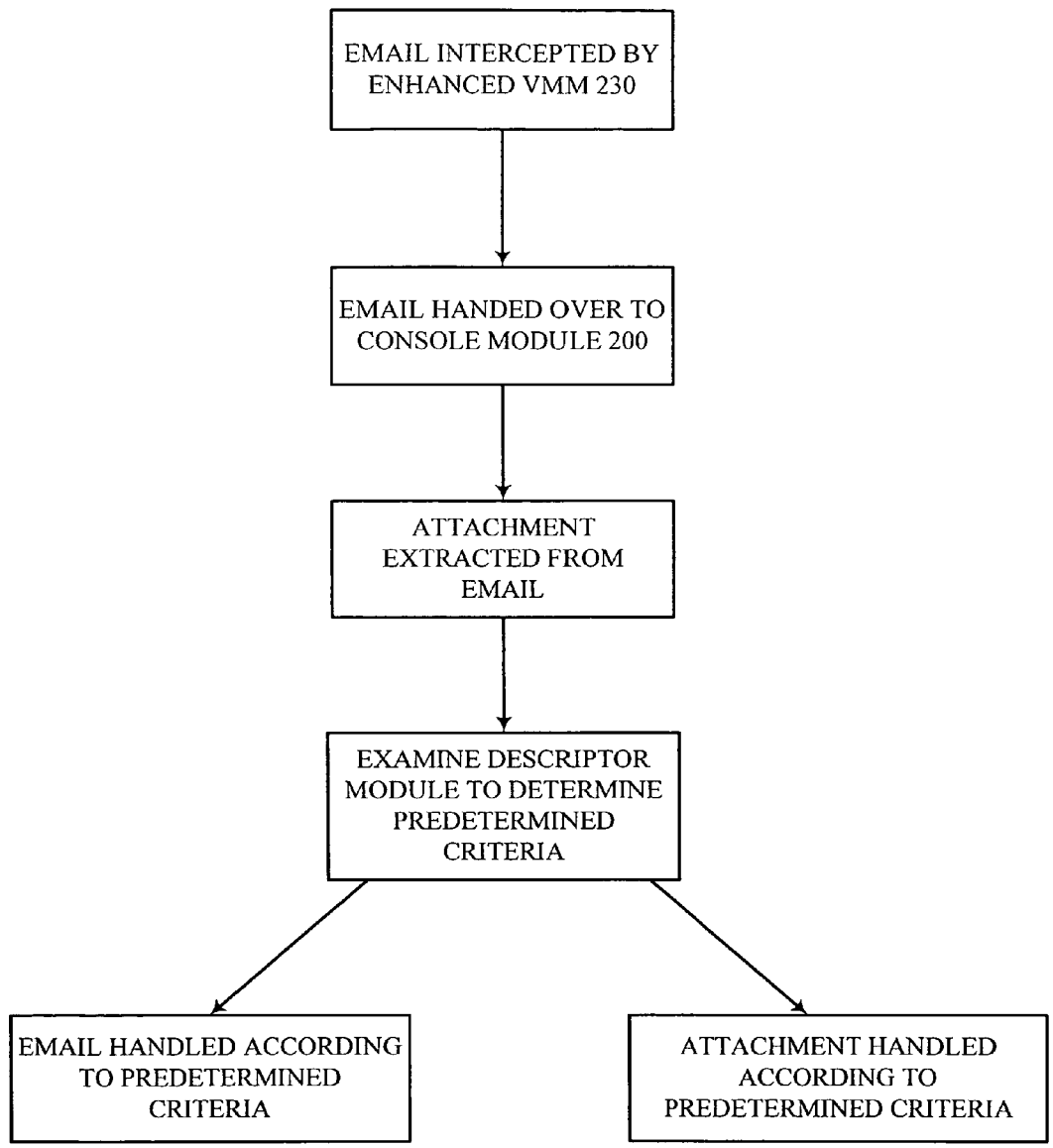
FIG. 3 is a flowchart that conceptually illustrates an example of how descriptors may be utilized to automatically handle an email with an attachment.

FIG. 3 is a flowchart that conceptually illustrates an example of how descriptors may be utilized to automatically handle an email with an attachment. As previously described, although the example focuses exclusively on email, embodiments of the invention are not so limited and may include any and/or all data accessed by and/or received by Host 100. Additionally, although the following operations may be described as a sequential process, many of the operations may in fact be performed in parallel and/or concurrently. In addition, the order of the operations may be re-arranged without departing from the spirit of embodiments of the invention.

In the example illustrated conceptually in the flowchart of FIG. 3, an incoming email may be intercepted by Console Module 200. The email attachment may be extracted from the email and based on various predetermined criteria, Console Module 200 may determine how to handle the attachment. For example, Console Module 200 may determine where to send an incoming attachment based on the attachment type (e.g., a Word file, a JPEG, an MPEG video file, etc), and not based on the original destination for the communication. Thus, if the incoming attachment is a video file and Descriptors 250 indicates that (a copy of) all video files are to be stored in VM 120, Console Module 200 may extract and store the attachment in VM 120. This extraction and storage may be invisible to the user, who may merely know that he/she has received an email with an attachment. When the user attempts to launch the video attachment, unknown to the user, Console Module 200, in conjunction with Enhanced VMM 230 may determine where the attachment is stored and launch the file. In this example, since the attachment is stored in VM 120, the actual processing for the video may be performed within the context of VM 120, thus isolating any potentially harm that the data may cause to the remaining VMs on Host 100. In one embodiment, this scheme may also enhance the user's experience, e.g., VM 120 may be running a real-time operating system and/or other dedicated hardware resources of Host 100, which may enable VM 120 to provide seamless audio/video playback. Certain VMs on Host 100 may always be running (e.g., VMs that containing PVR applications and/or VMs that host personal web servers). An embodiment of the present invention thus does not rely on a user being logged in to Host 100. According to this embodiment Console Module 200 may continue to monitor and manage the data for these VMs even when a user is not (or no longer) logged in.

In addition to determining how to handle the attachment, in one embodiment, Console Module 200 may also make the determination of when to deliver the attachment. If, for example, Descriptors 250 indicates that all attachments should be delivered immediately, Console Module 200 may store the attachment and inform VM 120 immediately where the file is stored. Descriptors 250 may, however, indicate that all attachments should be delivered only when a VM is idle. If so, Console Module 200 may schedule delivery of the information to VM 120 at a later time, when the VM is idle. This type of a "lazy" delivery scheme may enhance performance on Host 100 by minimizing unnecessary activity while the VMs are busy.

Again, as previously highlighted, although the above description assumes that the data received by Host 100 is an email having an attachment, embodiments of the present invention are not so limited. Embodiments of the present invention may manage any data received by Host 100 in a similar manner. Thus, for example, the data may be in any format including an HTTP reply, where the type may be determined by Multipurpose Internet Mail Extensions ("MIME") type, a generic flow where the type may be determined by characteristics of the flow content, by network port number, by input from applications, etc.

It will be readily apparent to those of ordinary skill in the art that Console Module 200 may be implemented in software, hardware, firmware and/or any combination thereof. Thus, for example, in one embodiment, Console Module 200 may comprise a VM. Enhanced VMM 230 may include various enhancements over existing VMMs, either to include the functionality of Console Module 200 and/or to interact with Console Module 200. It will be readily apparent to those of ordinary skill in the art that Enhanced VMM 230 may also be implemented in software (e.g., as a standalone program and/or a component of a host operating system), hardware, firmware and/or any combination thereof.

The usability of a virtualized host may be further enhanced in one embodiment of the invention wherein Console Module 200 includes a unification console to provide users with a unified view of the various VMs on Host 100. In addition to managing the content on the VMs, this embodiment of the invention may enable the user to interact with the application in various VMs without being aware of where the applications reside. Thus, in the above described example of an email received by the user, the email may be viewed by the user within the context of the unification console, without having to be aware of where the email program and/or mail spool/queue files and folders reside. In fact, in this embodiment, the user may not have to be aware of which VM the email program is running in. The user additionally does not have to manually switch to that VM in order to run and/or view output from the email. Although switching between VMs may not be especially cumbersome (e.g., a keystroke to switch from one VM to another), keeping track of what applications are running on each VM may prove to be difficult, especially if the host is configured to run more than two VMs (as is likely). Additionally, various VMs on the host may be configured to be always running, e.g., VMs that containing PVR applications and/or VMs that host personal web servers. According to embodiments of the present invention, the user does not have to be aware of these VMs. The unification console may additionally handle the email and email attachments according to Descriptors 250, thus significantly simplifying the user's interaction with the various VMs on Host 100.

Figure 4:
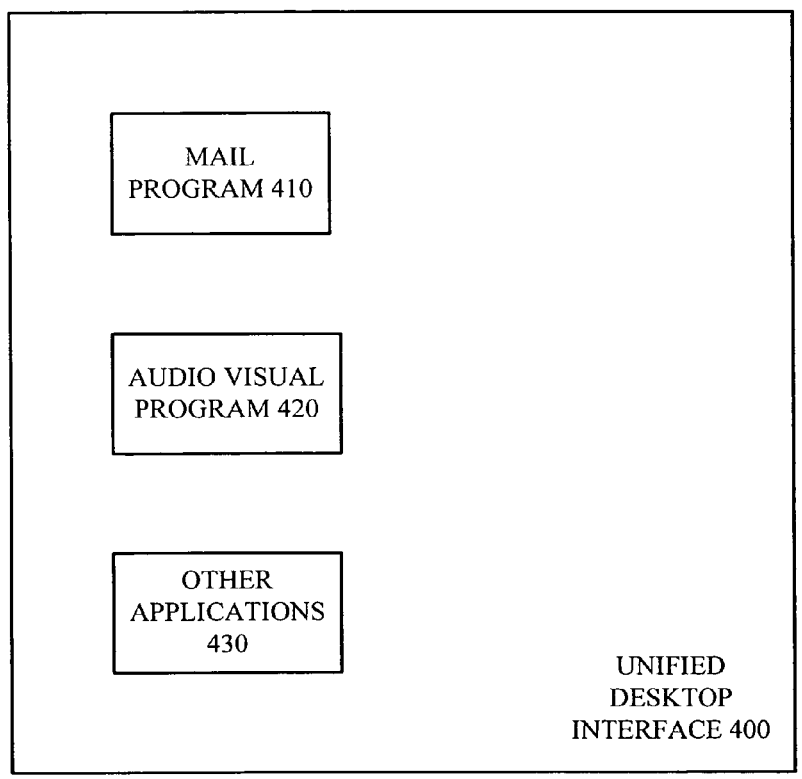
FIG. 4 illustrates an example of a unified user interface on the desktop of the VM host.

The unification console described above may be implemented in various ways without departing from the spirit of embodiments of the present invention. An example of a unification console is described below. In this example, a unified desktop interface on Host 100 may represent the unification console. As illustrated in FIG. 4, a user may be presented with Unified Desktop Interface 400, which is a logical representation of the views of all or a subset of the various VMs on Host 100 such that the user can see and/or launch applications in one or more VMs from this view. In various embodiments, the view presented to the user may resemble a typical desktop, but unknown to the user, the desktop may in fact represent applications contained in various VMs on the host.

In one embodiment, the user's view of Unified Desktop Interface 400 may include all applications available to the user. Thus, for example, if the user has access to all the VMs on Host 100, then the various applications in each partition may be visible and accessible to the user in Unified Desktop Interface 400. Alternatively, the user may only have permission to access a subset of VMs on the host, in which case the applications visible and accessible to the user may include only those contained in the authorized VMs. As illustrated, Mail Program 410, Audio Visual Program 420 and various other applications (shown collectively as "Other Applications 430") may be presented to the user in this interface without any indication of which VM these applications reside in. In fact, from the user's perspective, there may appear to be little to no difference between a non-virtualized environment and the virtualized environment of Host 100 (in which each application is contained in its own VM).

Unified Desktop Interface 400 illustrated in FIG. 4 is merely an example of an interface that the user may see, in which there is no indication that the host is virtualized. In an alternate embodiment, Unified Desktop Interface 400 may include a view of all the VMs as well as all the applications running in each VM. In yet another embodiment, in a layered VM environment, a unified desktop interface may exist across all VM layers. Alternatively, in a layered VM environment, a unified desktop interface may be provided with each VMM, thus enabling one unified desktop interface to be embedded in the unified desktop environment of a parent VM layer.

Various other unified desktop interfaces may be implemented without departing from the spirit of embodiments of the present invention. Most importantly, by presenting a unified view to the user, embodiments of the present invention significantly improve the usability of multiple VMs simultaneously, because the user's experience may resemble that of a typical desktop PC user, namely one in which the user simply selects an application (i.e., Guest Software) on Host 100 to execute, without needing to be aware of the virtual machines on the PC and/or how to manage or exchange the Guest Software files within these machines. Thus, for example, if the user selects Mail Program 410, as expected, the user may then be presented with the graphical output from Mail Program 410. The user may view this output within Unified Desktop Interface 400 and the underlying interaction with the various VMs on Host 100 may remain invisible to the user, i.e., the user does not know that Mail Program 410 is actually executing in one of the VMs on Host 100.

Although invisible to the user, a unification console in and/or working in conjunction with Console Module 200 may enable the unified interface by transparently redirecting the input and/or output from the user and the VMs such that the user does not have to know which VM an application resides in and/or is running in. For the purposes of this specification, input and/or output shall include any form of input and/or output that Host 100 may recognize. Thus, although "input" hereafter implies that it is a keystroke, a mouse click or mouse movement provided by the user, it may in fact include any other input scheme that Host 100 is capable of receiving such as network traffic and/or various other device inputs. Similarly, although "output" is described hereafter as primarily being visual output, embodiments of the present invention are not so limited. Output may therefore other types of output such as audio and/or tactile output.

The unification console in and/or working in conjunction with Console Module 200 may intercept, route, redirect and/or deliver input/output in various ways without departing from the spirit of embodiments of the present invention. In one embodiment, the unification console may also utilize Descriptors 250 to determine how to intercept, route, redirect and/or deliver input/output. Regardless of how it is implemented, the unification console (with or without a unified desktop interface) may further enhance embodiments of the present invention by simplifying the user's interactions with Host 100.

The hosts according to embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores and/or transmits information in any form accessible by a computing device, the machine-accessible medium including but not limited to, recordable/non-recordable media (such as read-only memory (ROM), random-access memory (RAM), magnetic disk storage media, optical storage media and flash memory devices), as well as electrical, optical, acoustical or other form of propagated signals (such as carrier waves, infrared signals and digital signals).

According to an embodiment, a computing device may include various other well-known components such as one or more processors. Thus, the computing device (e.g., Host 100) may include any type of processor capable of executing software, including microprocessors, multi-threaded processors, multi-core processors, digital signal processors, co-processors, reconfigurable processors, microcontrollers and/or any combination thereof. The processors may be arranged in various configurations such as symmetric multi-processors (e.g., 2-way, 4-way, 8-way, etc.) and/or in other communication topologies (e.g., toroidal meshes), either now known or hereafter developed. The term "processor" may include, but is not necessarily limited to, extensible microcode, macrocode, software, programmable logic, hard coded logic, etc., capable of executing embodiments of the present invention.

The processor(s) and machine-accessible media may be communicatively coupled using a bridge/memory controller (chipset), and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such current and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for enhancing usability of a plurality of virtual machines ("VMs") established on a VM host, the method comprising:

presenting, on the VM host, a unified interface to provide a user of the VM host a view of a plurality of applications executed in different VMs of the plurality of VMs;

intercepting, on a VM host, an incoming communication from a source remote to the VM host;
examining the communication to determine whether the communication includes an attached data file;
if the communication does not include the attached data file, allowing a virtual machine manager to deliver the communication to a recipient VM of the plurality of VMs;
if the communication includes the attached data file:
examining the communication to determine a communication type;
examining the data file to determine a data file type;
examining at least one descriptor module to determine how to handle the communication and the data file based on the communication type and the data file type; and
processing the data file and the communication according to information in at least one descriptor module,
wherein processing the communication comprises directing the communication to a VM of the plurality of VMs that is different from the recipient VM to which the communication was originally destined.

2. The method according to claim 1 wherein processing the data and the communication further comprises examining a second descriptor module to determine how to further handle the communication and the data.

3. The method according to claim 1 wherein intercepting incoming communication further comprises intercepting incoming communication in cooperation with the virtual machine manager.

4. The method according to claim 1 wherein examining the descriptor module to determine how to handle the communication based on the type of the data further comprises identifying an action to be taken based on the communication type and the data type, and processing the data and the communication further comprises executing the action.

5. A virtual machine ("VM") host, comprising:
a processor; and
a memory device communicatively coupled to the processor, the memory device having stored therein a plurality of instructions, which when executed by the processor, cause the processor to establish:
a plurality of VMs;
a unified interface to provide a view on the VM host of a plurality of applications executed in different VMs of the plurality of VMs;
a descriptor module comprising information correlating a data type to an appropriate action for the data type; and
a console module capable of (i) intercepting a communication received by the VM host, the communication destined for a recipient VM of the plurality of VMs, (ii) determining a data type of a data file attached to the communication, (iii) accessing the descriptor module to determine how to handle the data file based on the data type; and (iv) directing the communication to a VM of the plurality of VMs different from the recipient VM to which the communication was originally destined based on the data type.

6. The virtual machine host according to claim 5 wherein the console module is further capable of executing the appropriate action for the data type.

7. The virtual machine host according to claim 5 wherein the plurality of instructions further cause the processor to establish a virtual machine manager ("VMM") capable of communicating with the console module.

8. An article comprising a non-transitory, machine-accessible medium having stored thereon instructions that, when executed by a machine, cause the machine to:
establish a plurality of virtual machines (VMs) on a VM host;
present a unified interface on the VM host of a view of a plurality of applications executed in different VMs of the plurality of VMs;
intercept an incoming e-mail on VM host;
determine whether the incoming e-mail destined to a recipient VM of the plurality of VMs includes an attached data file;
determine a data type of the attached data file;
examine at least one descriptor module to determine how to process the data type of the attached data file, the at least one descriptor including information that correlates data types to actions to be taken based on the data types; and
process the attached data file according to the information in the at least one descriptor module,
wherein to process the attached data file comprises to direct the e-mail to a VM of the plurality of VMs different from the recipient VM to which the e-mail was originally destined.

9. The article according to claim 8 wherein the instructions, when executed by the machine, further cause the machine to process the attached data file by executing an action.

10. The article according to claim 9 wherein the instructions, when executed by the machine, further cause the machine to log information pertaining to the action for future use.

11. The article according to claim 8 wherein the instructions, when executed by the machine, further cause the machine to process the attached data file by examining a second descriptor module to determine how to further process the data.

12. The article according to claim 8 wherein the instructions, when executed by the machine, further cause the machine to prevent an action to be taken based on predetermined criteria.

13. The article according to claim 12 wherein the predetermined criteria includes at least one of a data type, a network port the data is processed by and a destination VM for the data.

14. The article according to claim 8 wherein the instructions, when executed by the machine, further cause the machine to:
examine the e-mail to determine a communication type;
examine the at least one descriptor module to determine how to process the e-mail based on the communication type; and
process the e-mail according to the information in the at least one descriptor module.

* * * * *